(12) United States Patent
Varland

(10) Patent No.: US 7,944,870 B2
(45) Date of Patent: May 17, 2011

(54) METHODS AND SYSTEMS FOR TEMPORARY ADDITIONAL TELEPHONE NUMBERS

(75) Inventor: Jason E. Varland, Palatine, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 211 days.

(21) Appl. No.: 11/147,989

(22) Filed: Jun. 8, 2005

(65) Prior Publication Data
US 2006/0291411 A1 Dec. 28, 2006

(51) Int. Cl.
*H04W 4/00* (2009.01)
*H04L 12/50* (2006.01)
*H04L 12/28* (2006.01)
*H04L 12/56* (2006.01)
*H04Q 11/00* (2006.01)
*H04J 3/24* (2006.01)

(52) U.S. Cl. ......... 370/313; 370/379; 370/397; 370/475

(58) Field of Classification Search .................. 370/313, 370/328, 379, 382, 383, 397, 475; 379/220.01
See application file for complete search history.

(56) References Cited

U.S. PATENT DOCUMENTS

| | | | | |
|---|---|---|---|---|
| 6,047,046 | A * | 4/2000 | Smets et al. | 379/88.25 |
| 6,076,093 | A * | 6/2000 | Pickering | 1/1 |
| 7,474,665 | B2 * | 1/2009 | Cho | 370/401 |
| 2003/0165121 | A1 * | 9/2003 | Leung et al. | 370/313 |
| 2004/0101123 | A1 * | 5/2004 | Garcia | 379/220.01 |
| 2004/0174880 | A1 * | 9/2004 | White et al. | 370/395.3 |
| 2004/0179537 | A1 * | 9/2004 | Boyd et al. | 370/395.54 |
| 2005/0198218 | A1 * | 9/2005 | Tasker et al. | 709/220 |
| 2005/0243819 | A1 * | 11/2005 | Peng et al. | 370/389 |
| 2006/0062176 | A1 * | 3/2006 | Ikemura et al. | 370/328 |
| 2006/0141981 | A1 * | 6/2006 | Lin | 455/403 |
| 2007/0155435 | A1 * | 7/2007 | Billmaier et al. | 455/565 |

* cited by examiner

*Primary Examiner* — Andrew Wendell
(74) *Attorney, Agent, or Firm* — Toler Law Group

(57) ABSTRACT

A temporary phone number system completes telephone calls only for non-expired telephone numbers. A user terminal makes a phone call to a subscriber terminal through a network having server. The subscriber terminal is associated with an IP address located at the server. A dynamic database of telephone numbers that ring the subscriber terminal resides at the IP address on the server. At least one number in the database expires at a selected time so that the call is completed only if the number input into the user terminal is not expired. Methods and computer-readable media containing instructions for performing the methods of the temporary phone number system are described.

22 Claims, 1 Drawing Sheet

METHODS AND SYSTEMS FOR TEMPORARY ADDITIONAL TELEPHONE NUMBERS

FIELD OF THE INVENTION

The present invention relates to the field of telephony, and in particular to systems, methods and computer-readable media containing instructions for providing temporary additional telephone numbers.

BACKGROUND OF THE INVENTION

To prevent others from interfering with their personal privacy, and to provide security and safety, people have relied on one-way telecommunications such as a pager, or on screening telephone calls with caller ID. For serious circumstances, some people even go so far as to change their telephone number or numbers, which can be costly and inconvenient as it requires notifying family and friends of the new number.

Published United States patent application US2004/0101123 by Garcia discloses a method for providing a temporary telephone number in which the temporary number is linked to a directory telephone number of the person being called. Garcia, however, does not disclose or suggest a method in which a temporary number is linked to a terminal that is associated with an IP address for Voice over Internet Protocol ("VoIP") telephony.

Accordingly, the present invention provides an easy and inexpensive solution to the telephony security problem with methods and systems for assigning temporary additional telephone numbers that expire after a defined period of time.

BRIEF DESCRIPTION OF THE DRAWINGS

The present invention is further described in the detailed description that follows, by reference to the noted drawings, by way of non-limiting examples of embodiments of the present invention, in which reference numerals represent the same parts throughout the several views of the drawings, and in which.

DETAILED DESCRIPTION OF THE INVENTION

Figure 1:
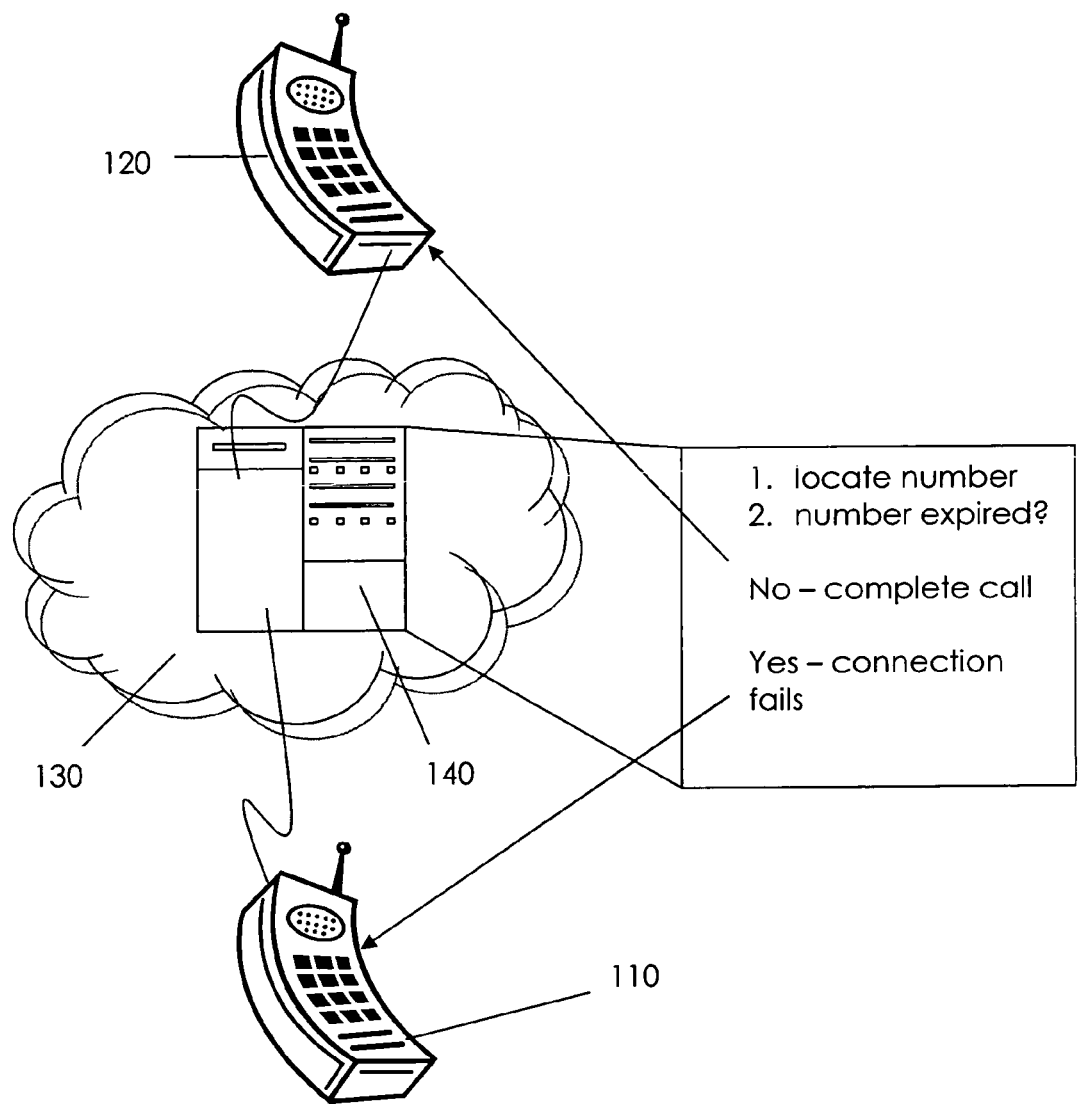
FIG. 1 is a conceptual block diagram of a specific exemplary embodiment of a temporary phone number system of the present invention.

In view of the foregoing, the present invention, through one or more of its various aspects, embodiments and/or specific features or sub-components, is thus intended to bring out one or more of the advantages that will be evident from the description. The present invention is described with frequent reference to Voice over Internet Protocol ("VoIP"). It is understood, however, that VoIP is merely an example of a specific embodiment of the present invention, which is directed broadly to telephony security within the scope of the invention. The terminology, examples, drawings and embodiments, therefore, are not intended to limit the scope of the invention.

The present invention offers a telephony feature so that telephone users can use a temporary telephone number that is valid for a defined period of time, similar to the way temporary credit card numbers are used for internet commerce. The invention is well suited for VoIP telephony.

VoIP, also called IP Telephony or Internet telephony, is enabling technology for routing of voice conversations over the Internet or any other IP network. The voice data travels over a general-purpose packet-switched network instead of the traditional dedicated, circuit-switched voice transmission lines. Protocols used to carry voice signals over the IP network are commonly referred to as Voice over IP or VoIP protocols.

VoIP has a number of advantages over traditional telephony. A significant advantage of VoIP as it relates to the present invention is that, with VoIP telephony, functionality is software- or protocol-based so that innovative telephony features may be achieved by programming the telephone rather than by investing in new hardware.

VoIP traffic may be deployed on any IP network, including ones lacking an internet connection, such as, for instance, on a building-wide LAN without an internet connection.

Telecommunications providers routinely use IP telephony, often over a dedicated IP network, to connect switching stations, converting voice signals to IP packets and back. The result is a data-abstracted digital network which the provider can easily upgrade and use for multiple purposes. Corporate customer telephone support often use IP telephony exclusively to take advantage of the data abstraction. One benefit of using this technology is the need for only one class of circuit connection and better bandwidth use.

IP telephony is commonly used to route traffic starting and ending at conventional Public Switched Telephone Network ("PSTN") telephones. VoIP is widely employed by carriers, especially for international telephone calls. Electronic Numbering (Enum) uses standard phone numbers, but allows connections entirely over the Internet. If the other party uses Enum, the only expense is the Internet connection.

In the overwhelming majority of implementations, Real-time Transport Protocol ("RTP") is used to transmit VoIP traffic. Signaling protocols include Session Initiation Protocol (SIP), H.323, Skinny Client Control Protocol (proprietary protocol from Cisco), Megaco (a.k.a. H.248) and MGCP, MiNET (proprietary protocol from Mitel), and IAX. Several different speech codecs can be used for stream audio compression. Commonly used codecs for VoIP traffic include G.711 and G.729, both ITU-T-specified codecs.

A recent development pertinent to the present invention is the introduction of mass-market VoIP services over broadband Internet access services. Subscribers make and receive calls as they would over the PSTN. This requires an analog telephone adapter (ATA) to connect a telephone to the broadband Internet connection. Some US companies offer unlimited IP calling in the USA, and sometimes to Canada or to selected countries in Europe or Asia, for a flat monthly fee. One advantage of this is the ability to make and receive calls as one would at home, anywhere in the world, at no extra cost. That is, IP calls do not incur charges—as call diversion does via the PSTN—and the called party does not have to pay for the call.

There are a number of VoIP products and services available. Asterisk™ PBX is the popular Linux-based open source software PBX switch. Babble™ is a UK-based VoIP network. BroadVoice™ is a US-based VoIP network that supplies VoIP adapters, or allows customers to use their own Session Initiation Protocol ("SIP') devices. GnomeMeeting™ is the popular Linux-based open source softphone and supports H.323 and SIP. LignUp Corporation provides a web services based VoIP platform that makes telephony development as easy as web development. PhoneGaim is a free VoIP system based on GAIM and SIP (Gaim is a multi-platform instant messenger that supports many commonly used instant messaging systems). ReSIProcate is a robust and feature rich open source SIP stack. Teleo™ is a VoIP client that can be integrated into a variety of devices. TelTel™ is an Instant Voice software which is combined IM-like features and telephony functions. TeISIP™ is a European-based VoIP network providing a SIP solution that traverses Firewalls and Proxies. YATE is a free software VoIP telephony engine (VoIP server and client for H.323, IAX, SIP). Tivi™ is a SIP VoIP client softphone. A softphone is software that simulates a real phone and runs on a general purpose computer, rather than a dedicated device. It is usually used with a headset connected to the sound card of the PC or USBphone. Softphones are typically a part of VoIP environments and may be standard-based SIP/H.323 or proprietary. Many implementations are available, like the widely available Microsoft Windows® Messenger or NetMeeting™.

GameComm™ Roger WilCO™, Teamspeak™ and Ventrilo™ offer voice communication programs that are popular in online gaming.

A subscriber terminal of the present invention is associated with an IP address, not unlike how a website is assigned an IP address with the Domain Name System. The Domain Name System ("DNS") is a system that stores information about hostnames and domain names in a distributed database on networks such as the Internet. Most importantly, it provides an IP address for each hostname, and lists the mail exchange servers accepting e-mail for each domain. The DNS is hierarchical in structure and organizes information into domains and subdomains. The structure facilitates finding the location (IP address) of the servers for a specified host or domain name.

In the present invention, a subscriber's telephone such as a cellular phone is associated with an IP address that hosts a dynamic database of telephone numbers that ring the telephone. This may be distinguished from the directory number of the Garcia reference, described above, in a number of respects. For one, under Garcia, it is the subscriber herself who is associated with the directory number, whereas with the present invention it is the subscriber's terminal that is associated with the temporary numbers. That is, under the present invention the subscriber's identity is more secure than it is under Garcia. For another, the database of the present invention is dynamic. The telephone numbers in the database are in flux with frequently changing status, such as expired or non-expired, or having a timer of sorts counting down towards the expiration of the number. Accordingly, the database of the present invention is more sophisticated than a mere directory.

Turning now to FIG. 1, FIG. 1 is a conceptual block diagram of a specific exemplary embodiment of a temporary phone number system of the present invention. User terminal 110 makes a phone call to subscriber terminal 120 through network 130 having server 140. Subscriber terminal 120 is associated with an IP address located at server 140. A database of telephone numbers that ring subscriber terminal resides at the IP address on server 140.

One or more selected numbers in the database are set to expire on a selected date or after a defined period of time. Subscriber telephone 120 is programmed to alert the subscriber of an in-coming call on any of the non-expired numbers in the subscriber's database. The determination of whether a number is expired is made at the server level of the system in the embodiment of FIG. 1, as illustrated by the process window extending from server 140. Such determination may be made, for example, by an intelligent database residing at server 140 and programmed in accordance with the invention. An alternative embodiment provides an intelligent subscriber terminal 120 such that the information from server 140 that the number is expired is transmitted with the call to subscriber terminal 120, where terminal 120 then terminates the connection to terminal 110.

Alternative embodiments provide terminal 120 with a display feature that displays numbers in the database together with status information such as whether the number is expired. Other embodiments provide a renew option so that the subscriber can elect to renew an expired number or a number near to expiration. Still other embodiments provide for a selected number in the database to expire after a predetermined length of time, such as for example, one week after entering the number into the database; whereas another embodiment provides for the number to expire on pre-selected date and time, such as for example, midnight December 31. Additional embodiments provide both voice and data communication capabilities.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. The invention is considered to include a tangible storage medium or distribution medium, as listed herein and including art-recognized equivalents and successor media, in which the software implementations herein are stored.

Accordingly, those skilled in the art will recognize that the present invention extends to computer readable media ("CRM") contain instructions for execution by a computer. CRM is broadly defined to include any kind of computer memory such as floppy disks, conventional hard disks, CD-ROMs, Flash ROMS, nonvolatile ROM, RAM, Storage Media, email attachments, solid state media, magnetic media, and signals containing instructions, together with processors to execute the instructions.

Thus, the present invention contemplates a CRM containing a set of instructions, or that receives and executes instructions from a propagated signal, for execution by a computer to complete a communication connection by input of a number at a user terminal to a subscriber terminal in a communication network having a server that hosts an IP address, wherein a dynamic database of telephone numbers that alert the subscriber terminal to an in-coming communication resides at the IP address, the instructions including the steps of: associating the subscriber terminal with the IP address; selectively assigning an expiration time to at least one number in the database; determining whether a number in the database is expired; and completing a communication connection from the user terminal to the subscriber terminal only for a non-expired number.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The invention has been described with reference to several exemplary embodiments. It is understood, however, that the words used are words of description and illustration, rather than words of limitation. Changes may be made within the purview of the appended claims, as presently stated and as amended, without departing from the scope and spirit of the invention in all its aspects. Although the invention has been described with reference to particular means, materials and embodiments, the invention is not intended to be limited to the particulars disclosed; rather, the invention extends to all functionally equivalent technologies, structures, methods and uses such as are within the scope of the appended claims.

I claim:

1. A non-transitory computer-readable medium including instructions executable by a computer to:
    receive data from a user terminal via a communication network; wherein the data includes a first telephone number;
    associate a subscriber terminal device with an Internet Protocol (IP) address;
    access a database that associates a plurality of Voice-over IP (VoIP) telephone numbers with the IP address of the subscriber terminal device such that, when a call to any of the plurality of VoIP telephone numbers is received, the call is directed to the subscriber terminal device via the IP address, wherein at least one of the plurality of VoIP telephone numbers is assigned an expiration time;
    determine from information in the database whether the first telephone number is one of the plurality of VoIP telephone numbers associated with the IP address;
    determine from information in the database whether the first telephone number is expired when the first telephone number is one of the plurality of VoIP telephone numbers associated with the IP address;
    complete a communication connection from the user terminal to the subscriber terminal device when the first telephone number is non-expired; and
    send display data to the subscriber terminal device, wherein the display data identifies the plurality of VoIP telephone numbers associated with the IP address of the subscriber terminal device, identifies expiration times associated with one or more of the plurality of VoIP telephone numbers, and includes a renew option to enable the subscriber terminal device to extend the expiration time of one or more unexpired VoIP telephone numbers.

2. The non-transitory computer-readable medium of claim 1, wherein the database resides at the server.

3. The non-transitory computer-readable medium of claim 1, wherein the communication network comprises a wireless network.

4. The non-transitory computer-readable medium of claim 1, wherein the renew option allows the user to renew one or more expired VoIP telephone numbers.

5. The non-transitory computer-readable medium of claim 1, comprising computer executable instructions to expire a selected telephone number in the database after a pre-determined length of time.

6. The non-transitory computer-readable medium of claim 1, further comprising computer executable instructions to expire a selected telephone number in the database on a pre-selected date and time.

7. The non-transitory computer-readable medium of claim 1, wherein the communication connection enables communication including data transmission.

8. A method, the method comprising:
    receiving data including a first telephone number via a communication network at a server from a user terminal, wherein the server associates a subscriber terminal device with an Internet Protocol (IP) address;
    accessing a database with the server, wherein the database associates a plurality of Voice-over IP (VoIP) telephone numbers with the IP address, wherein the server uses the IP address to ring the subscriber terminal device in response to calls directed to the plurality of VoIP telephone numbers and wherein at least one of the plurality of VoIP telephone numbers stored in the database has an expiration time;
    determining, at the server, whether the first telephone number is one of the plurality of VoIP telephone numbers associated with the IP address;
    determining, at the server, whether the first telephone number is expired when the first telephone number is one of the plurality of VoIP telephone numbers with the IP address;
    completing, at the server, a communication connection from the user terminal to the subscriber terminal device when the first telephone number is non-expired; and
    sending, from the server to the subscriber terminal, a display feature that presents the plurality of VoIP telephone numbers, status information for the VoIP telephone numbers, and a renew option to extend the expiration time of one or more unexpired VoIP telephone numbers.

9. The method of claim 8, further comprising:
    locating the first telephone number in the database; and
    evaluating whether an expiration time corresponding to the first telephone number has been exceeded.

10. The method of claim 8, wherein the communication network comprises a wireless network.

11. The method of claim 8, wherein the renew option allows renewal of an expired VoIP telephone number.

12. The method of claim 8, further comprising expiring a selected telephone number in the database after a pre-determined length of time.

13. The method of claim 8, further comprising expiring a selected telephone number in the database on a pre-selected date and time.

14. The method of claim 8, wherein the communication connection enables communication including data transmission.

15. A system for completing a communication connection between a user terminal and a subscriber terminal device, the system comprising:
    a server comprising a processor and a memory, wherein an IP address associated with the subscriber terminal device is hosted at the server; and
    a database comprising a plurality of Voice-over IP (VoIP) telephone numbers associated with the IP address, wherein the IP address is used to ring the subscriber terminal device associated with the IP address in response to a call received at any of the plurality of VoIP telephone numbers, wherein the database is hosted at the server;

wherein an expiration time is assigned to at least one telephone number of the plurality of VoIP telephone numbers;

wherein the server establishes a communication connection to the subscriber terminal device in response to receiving a telephone call directed to a first telephone number of the plurality of VoIP telephone numbers when the first telephone number is non-expired; and wherein the memory includes computer instructions executable by the processor to receive a renew option to extend the expiration time of one or more unexpired VoIP telephone numbers.

16. The system of claim 15, wherein the memory comprises computer executable instructions executable by the processor to:

associate the subscriber terminal device with the IP address;

assign a corresponding expiration time to at least one telephone number of the plurality of VoIP telephone numbers;

associate the communication connection with the first telephone number;

determine whether the first telephone number is expired; and complete the communication connection from a user terminal to the subscriber terminal when the first telephone number is non-expired.

17. The system of claim 16, wherein the computer-readable medium comprises one or more of the following: CD-ROM, floppy disk, conventional hard disk, solid state medium, magnetic medium, and non-volatile memory.

18. The system of claim 15, wherein the server, the user terminal, and the subscriber terminal comprise a communication network.

19. The system of claim 15, wherein the memory further comprises computer instructions executable by the processor to receive a renew option from the subscriber terminal device and to revive and assign a new expiration data for a VoIP telephone number that expired.

20. The system of claim 15, wherein a selected telephone number in the database expires after a pre-determined length of time.

21. The system of claim 15, wherein a selected telephone number in the database expires on a pre-selected date and time.

22. The system of claim 15, wherein the communication connection enables communication comprising data transmission.

* * * * *